United States Patent [19]

Neff

[11] Patent Number: 4,858,712

[45] Date of Patent: Aug. 22, 1989

[54] SPEED RESPONSIVE POWER STEERING SYSTEM

[75] Inventor: Charles E. Neff, Ferndale, Mich.

[73] Assignee: TRW Inc., Lundhurst, Ohio

[21] Appl. No.: 237,041

[22] Filed: Aug. 29, 1988

[51] Int. Cl.$^4$ ............................................. B62D 5/08
[52] U.S. Cl. ............................... 180/143; 137/625.17; 137/625.32
[58] Field of Search ............................. 180/143, 142; 137/625.17, 625.3, 625.31, 625.32

[56] References Cited

U.S. PATENT DOCUMENTS

| 4,173,987 | 11/1979 | Kouda | 180/143 |
| 4,561,516 | 12/1985 | Bishop | 180/142 |

FOREIGN PATENT DOCUMENTS 54-162339 12/1979 Japan .

Primary Examiner—John A. Pekar
Attorney, Agent, or Firm—Tarolli, Sundheim & Covell

[57] ABSTRACT

A hydraulic power assisted vehicle steering system includes a steering input shaft which is journalled for rotation in a housing and fixed axially in the housing; an inner valve sleeve pinned to the input shaft and rotating therewith; and an outer valve sleeve fixed axially in the housing and rotatable about the inner valve sleeve. Turning the steering input shaft causes relative rotation between the inner and outer valve sleeves, directing fluid flow to control directional assist. The inner valve sleeve slides axially between the input shaft and the outer valve sleeve. Axial sliding movement of the inner valve sleeve progressively covers and uncovers wide end portions of fluid control grooves in one of the valve sleeves. When the wide end portions are uncovered, greater relative rotation between the inner and outer valve sleeves is required before assist is generated. The inner valve sleeve is moved axially as a function of vehicle speed, to provide more assist at lower speeds and progressively less assist as vehicle speed increases.

14 Claims, 6 Drawing Sheets

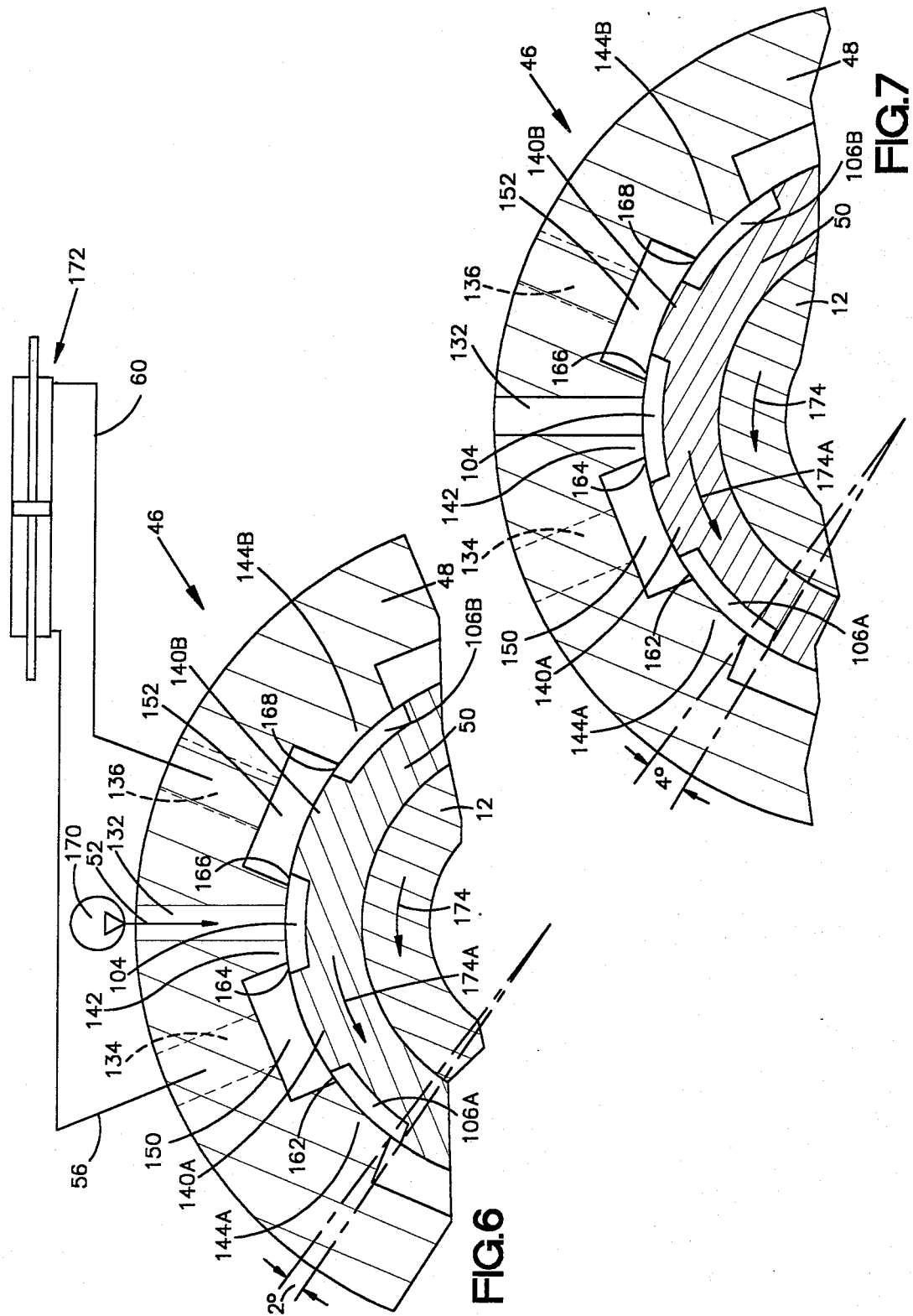

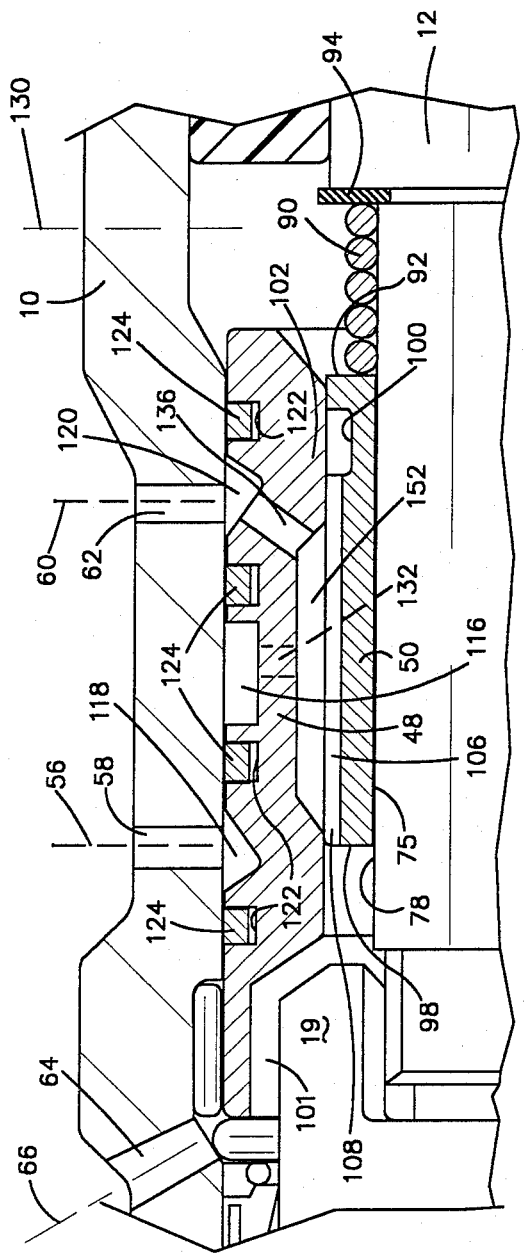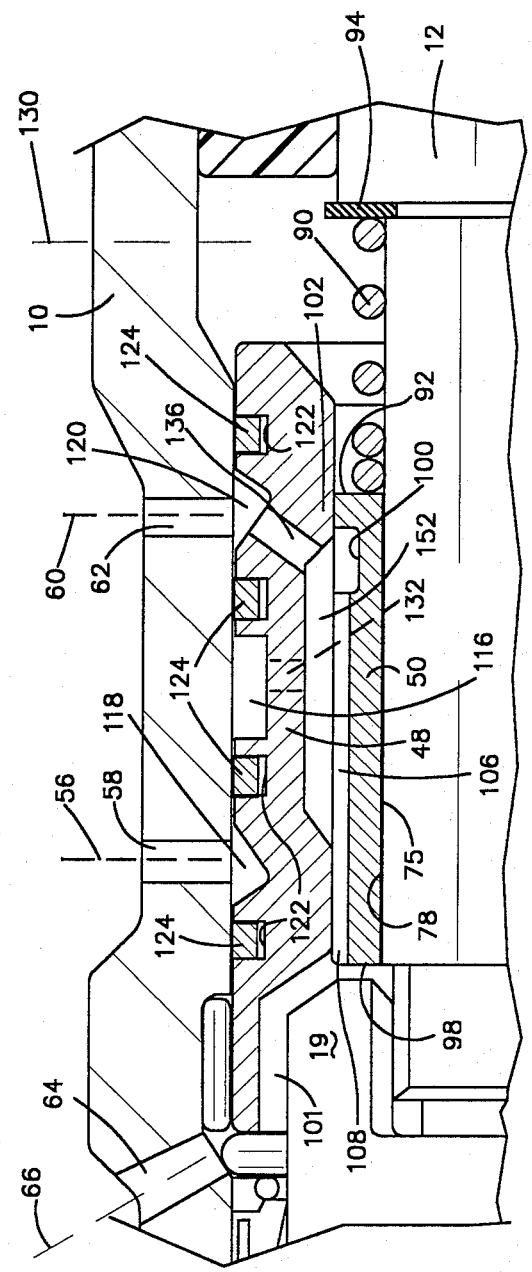

SPEED RESPONSIVE POWER STEERING SYSTEM

BACKGROUND OF THE INVENTION

1. Technical Field

The present invention relates to a power assisted steering system for a vehicle. In particular, the present invention relates to a power assisted steering system which varies the amount of power assist as a function of vehicle speed.

2. Description of the Prior Art

U.S. Pat. No. 4,561,516 discloses a power assisted vehicle steering system which varies the amount of power assist as a function of vehicle speed. The steering system includes a hydraulic control valve for directing fluid under pressure to a power assist motor. The control valve includes a valve core rotatable within a valve sleeve. The valve core is formed as an integral part of the steering input shaft. The outer surface of the valve core and the inner surface of the valve sleeve have cooperating lands and grooves. Relative rotation between the valve core and the valve sleeve varies the width and the area of orifices defined by adjacent edges of opposing grooves and lands, thus controlling the fluid flow through the valve in response to turning of the input shaft.

The valve sleeve shown in U.S. Pat. No. 4,561,516 is axially slidable relative to the valve core. Changes in vehicle speed cause a control valve in the fluid return line to progressively vary the pressure of fluid which bears on an end surface of the valve sleeve. Such pressure change causes the valve sleeve to move axially. As the valve sleeve moves axially in response to higher vehicle speeds, it unmasks relatively wide end portions of grooves on the valve core. As the relatively wide end portions are unmasked, the amount of power assist is reduced. Thus, as vehicle speed increases, the amount of power assist decreases.

The apparatus shown in U.S. Pat. No. 4,561,516 utilizes axial movement of the valve sleeve to vary the amount of power assist. The valve sleeve slides axially along the inside surface or bore of the valve housing. However, the area between the valve sleeve and the valve housing must be sealed against fluid leakage therebetween. This requires the valve sleeve to include relatively hard seals which bear against the softer surface of the valve housing, and significant valve bore wear can occur. As the valve bore wears, sticking movements of the valve sleeve can occur, resulting in unpredictable changes of steering assist levels. Eventually, axial displacement of the sleeve can be prevented and complete failure of the system results. It is therefore desirable to provide for relative axial motion between the two valve elements, without having the valve sleeve slide axially against the valve housing.

SUMMARY OF THE INVENTION

In accordance with the present invention, a power assisted steering system includes a hydraulic control valve in which the outer valve element is axially fixed, and the inner valve element moves axially. If the inner valve element were formed as an integral part of the steering input shaft, this would create significant other problems, because the input shaft is required to transmit up to 40 in-lbs of torque. Axial translation of such a torque transmitting member would require a spline, key, or precision ball arrangement. This torque would generate a substantial amount of friction in the spline or key area. Therefore, a substantial amount of force would be required to move the input shaft to a desired axial relationship with respect to the valve sleeve.

Accordingly, in the present invention the grooves and lands which are normally formed on the outer surface of the input shaft are separated from the input shaft and are located on a separate, "inner" sleeve element which is slip fit onto the input shaft and rotates along with the input shaft. The input shaft has a short pin extending radially from its outer surface. The pin fits in a narrow, axially extending slot in the inner valve sleeve. This pin/slot combination (i) prevents the inner valve sleeve from rotating relative to the input shaft, thus allowing the two to turn and function as one to control directional assist; and (ii) allows the inner valve sleeve to move axially relative to the outer valve sleeve, to progressively mask and unmask relatively wide end portions of certain grooves in order to vary the amount of power assist.

Since the outer valve sleeve is fixed axially, it does not slide against the valve housing. This eliminates the problem of valve bore wear. The inner valve sleeve does slide against the input shaft. However, no fluid under pressure is conducted between the inner sleeve and the input shaft, so no seals are needed there and the parts may have smooth mating surfaces over their entire length. Accordingly, no significant wear occurs.

BRIEF DESCRIPTION OF THE DRAWINGS

Further features of the present invention will become apparent to those skilled in the art to which the present invention relates from reading the following specification with reference to the accompanying drawings, in which:

FIG. 4 is a pictorial view of the inner valve sleeve member of the control valve of FIG. 1;

FIG. 6 is a partial transverse sectional view through the control valve, taken along the lines 6—6 of FIG. 1;

FIG. 7 is a partial transverse sectional view through the control valve of FIG. 1, taken along the lines 7—7 of FIG. 1 with the inner valve sleeve member in a high-speed position;

FIG. 8 is a partial schematic view showing the inner valve sleeve in a low speed position; and FIG. 9 is a partial schematic view showing the inner valve sleeve in a high speed position.

DESCRIPTION OF A PREFERRED EMBODIMENT

Figure 1:
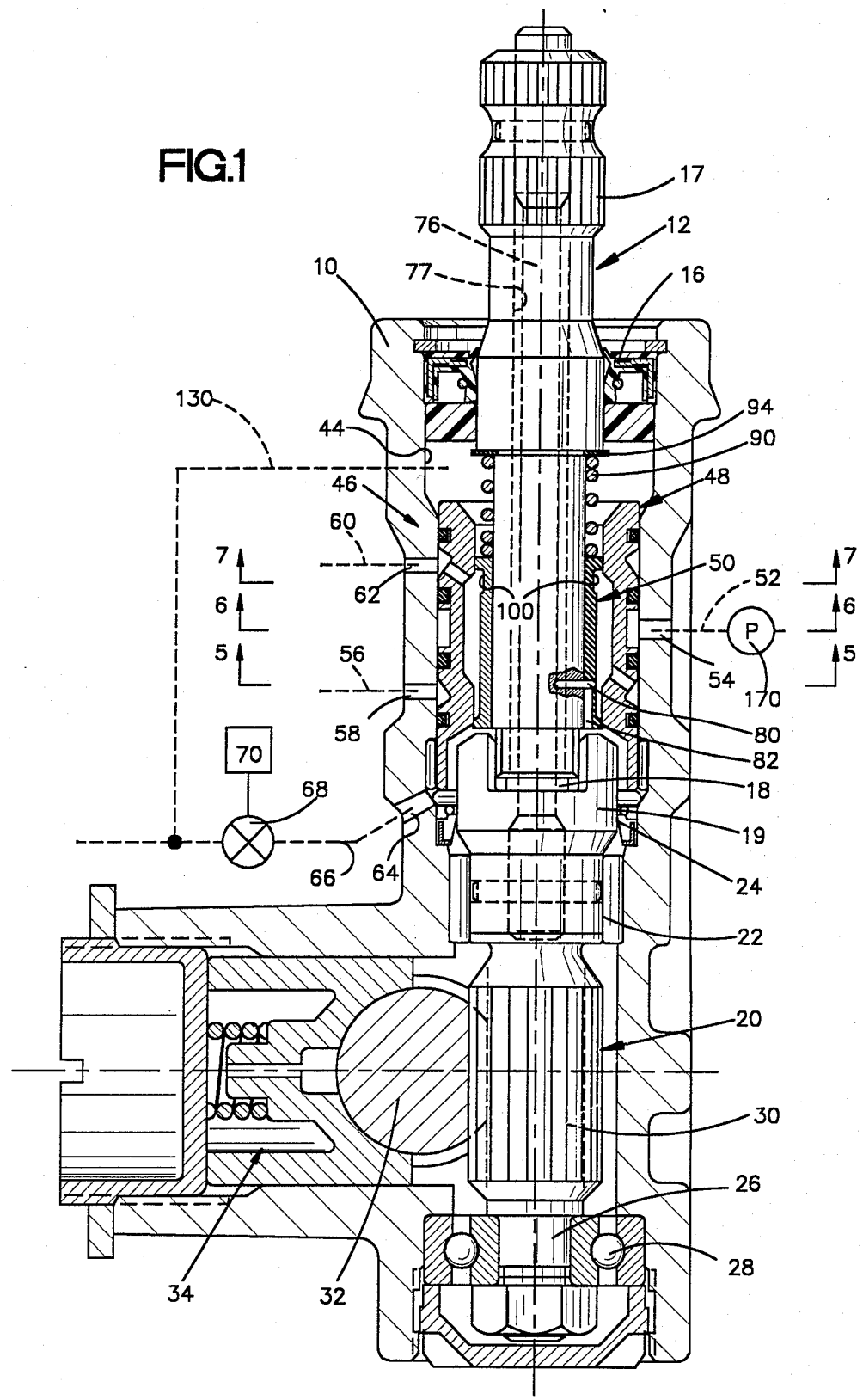
FIG. 1 is a view partly in section of a power assisted rack and pinion steering assembly constructed in accordance with the present invention and incorporating a hydraulic control valve.

FIG. 1 illustrates a portion of a power assisted rack and pinion steering assembly constructed in accordance with the present invention. The steering assembly includes a housing 10; a steering input shaft 12; a pinion 20; a rack 32; and a control valve which is indicated generally at 46, and which serves to direct the flow of high-pressure hydraulic fluid in order to translate rotary movement of the input shaft 12 into axial (linear) movement of the rack 32.

Within the housing 10 the steering input shaft 12 is sealed at 16. The input shaft 12 is splined at its outboard end 17 for connection to the vehicle handwheel. The other end 18 of the input shaft 12 is received in a first end 19 of a pinion or output shaft 20. The first end 19 of the pinion 20 is journaled at 22, the joint being sealed at 24. The other end 26 of the pinion 20 is journaled in the housing 10 at 28.

The pinion 20 has on its outer surface a plurality of pinion teeth 30 which mesh with a plurality of rack teeth (not shown) on the rack 32. The rack 32, which is shown in transverse section, is connected through appropriate steering linkage to the steerable wheels (not shown) of the vehicle, so that axial movement of the rack 32 effects turning of the vehicle wheels. The rack 32 is mounted in the housing 10 by a rack mounting assembly shown generally at 34, which keeps the rack 32 in engagement with the pinion 20.

The control valve 46 controls the flow of pressurized hydraulic fluid between a pump 170 and a power steering motor 172 (FIG. 6) which acts on the rack 32. A high pressure fluid conduit line 52 (FIG. 1) extends from the pump 170 to an inlet port 54 in the housing 10. A fluid line 56 extends from one motor port 58 in the housing 10, and a second fluid line 60 extends from another motor port 62 in the housing. The fluid lines 56 and 60 extend to opposite sides of the hydraulic motor 172 which may be a known piston-cylinder type motor to control axial displacement of the rack 32. Low pressure hydraulic fluid is discharged from the control valve 46 through a return port 64 in the housing 10, and flows outwardly via a return line 66 back to the reservoir for the pump 170. A restrictor valve 68, which is actuated by a control means shown schematically at 70, controls the fluid flow through the return line 66, as will be described hereinafter.

A torsion bar 76 extends through a bore 77 in the shaft 12. The torsion bar 76 is secured to the first end 19 of the pinion 20 and is pinned to the splined end 17 of the input shaft 12. In the exploded view, FIG. 2, the torsion bar 76 is shown separated from the input shaft 12.

The inner valve sleeve 50 (FIG. 2) is slip fit on a smooth cylindrical surface 78 of the input shaft 12. A locator pin 80, which extends radially from the input shaft 12, is received in a locator slot 82 extending through the wall of the inner valve sleeve 50 (see also FIG. 3.) The outer valve sleeve 48 fits closely about the inner valve sleeve 50. The outer valve sleeve 48 is secured to the pinion 20 by a pin 84 fixed to the pinion 20 and extending radially outwardly from the pinion 20. The pin 84 is received in an opening 86 in the outer valve sleeve 48.

The input shaft 12, the outer valve sleeve 48, and the pinion 20 are all fixed axially relative to each other. The outer valve sleeve 48 is pinned to and rotates along with the pinion 20, and the inner valve sleeve 50 is pinned to and rotates along with the input shaft 12. The input shaft 12 and the pinion 20 are connected by the torsion bar 76 for limited relative rotation (about 4° to 5°). Should this amount of relative rotation be exceeded, as when the hydraulic system might fail completely, a pair of flats 88 on the inboard end 18 of the input shaft 12 will engage corresponding surfaces on the end 19 of the pinion 20, so that further rotation of the input shaft 12 will cause rotation of the pinion 20. This creates a direct mechanical connection between the vehicle handwheel and the rack, by which steering can be manually effected.

The inner valve sleeve 50 (see FIG. 3) is mounted on the smooth outer surface 78 of the input shaft 12. The locator pin 80 extends radially from the input shaft 12 and is received in the axially extending locator slot 82 in the inner valve sleeve 50. A coiled spring 90 is retained between one axial end surface 92 of the inner valve sleeve 50 and a snap ring 94 on the input shaft 12. The other axial end surface 98 (FIG. 3) of the inner valve sleeve 50 is exposed to the pressure of fluid in a fluid return chamber 101, which communicates with the return fluid port 64. The inner valve sleeve 50 can slide along the surface 78 of the input shaft 12 and is biased axially to the left, as viewed in FIG. 3, by the spring 90. Axial movement of the sleeve 50 to the left in FIG. 3 is limited by engagement of the locator pin 80 with an end surface 96 of the locator slot 82.

FIG. 4 shows the inner valve sleeve 50 in detail. The inner valve sleeve 50 is generally cylindrically shaped and has a smooth inner surface 75, and an outer surface 102, both extending axially between the end surfaces 98 and 92. A plurality of axially extending grooves 104 and a plurality of axially extending grooves 106 are formed in the outer surface 102 of the inner valve sleeve 50. The plurality of grooves 104 are closed at both ends by lands 105. The plurality of grooves 106 are open at their ends 108 opposite from the ends having the widened end portions 100. The grooves 106 are in fluid communication with the fluid return chamber 101, as best seen in FIG. 3.

The locator slot 82 (FIG. 4) extends axially from the one end surface 98. The locator slot 82 is shown as being formed within one of the open-ended grooves 106; however, the locator slot 82 may if desired be placed elsewhere along the periphery of the inner valve sleeve 50. The locator slot 82 is sized so as to closely engage the locator pin 80 in order to prevent relative rotation between the input shaft 12 and the inner valve sleeve 50.

Figure 2:
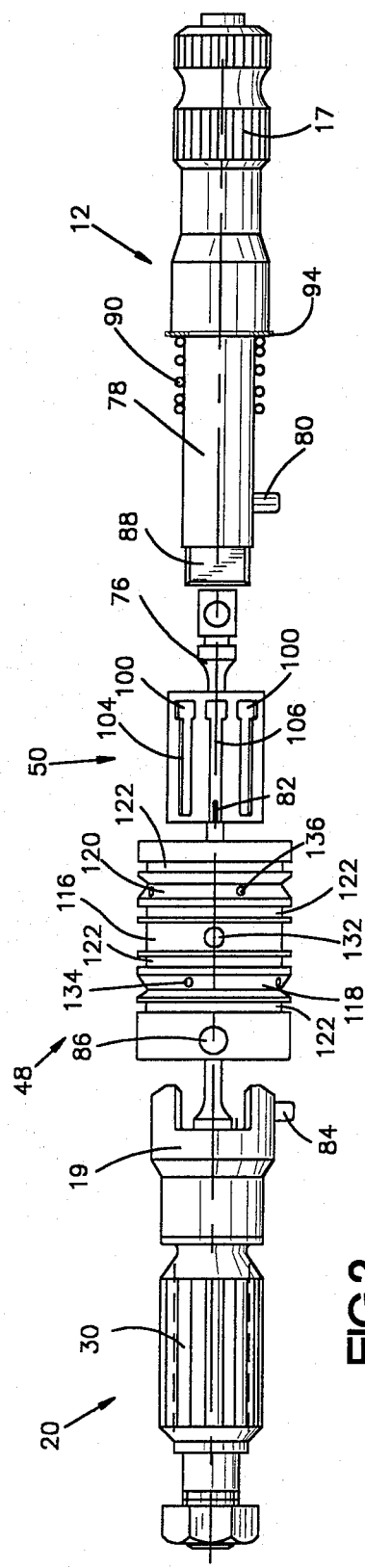
FIG. 2 is an exploded pictorial view of the control valve of FIG. 1.
Figure 3:
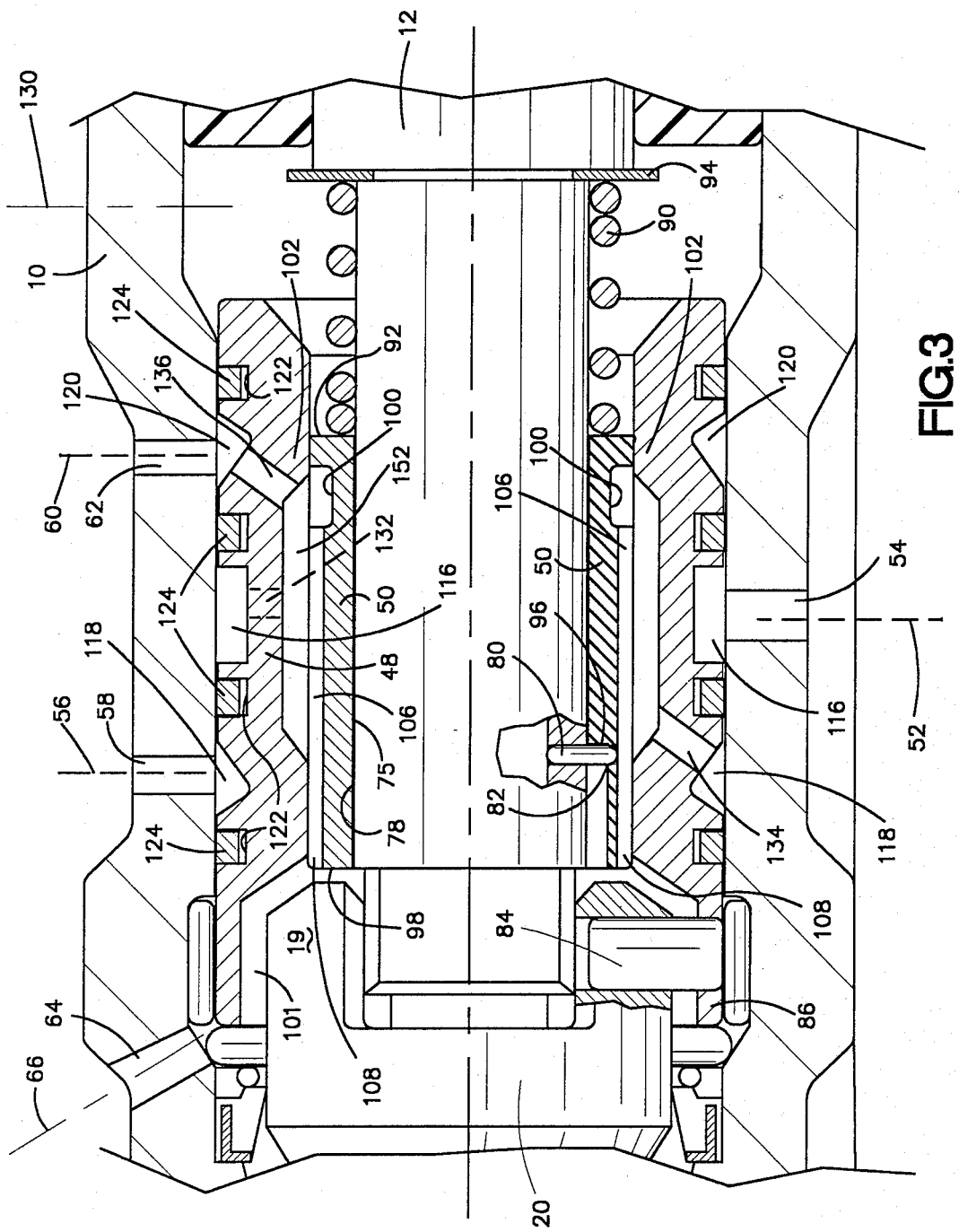
FIG. 3 is a view of a portion of FIG. 1 on an enlarged scale.
Figure 5:
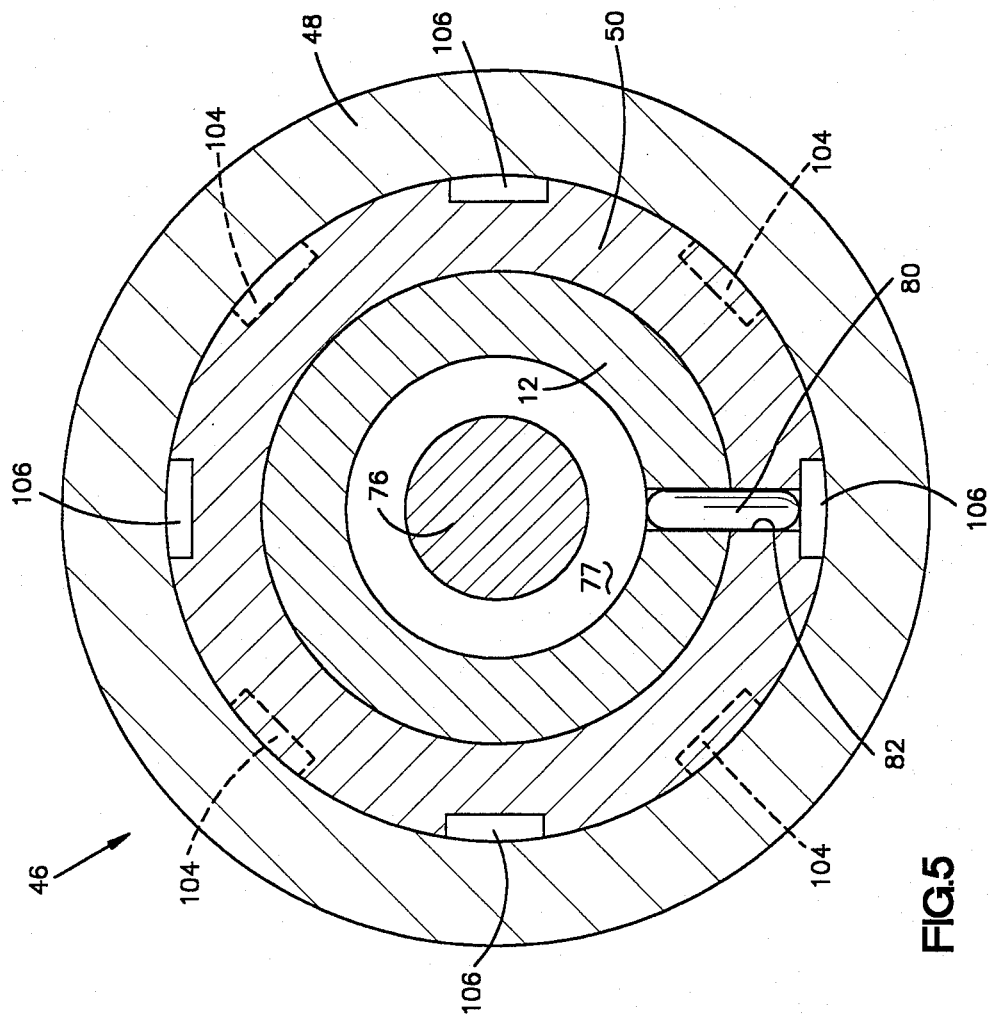
FIG. 5 is a transverse sectional view through the control valve, taken along the lines 5—5 of FIG. 1.

A plurality of annular grooves are formed in the outer surface of the outer valve sleeve 48 (see FIGS. 2 and 3). These include a fluid inlet groove 116, a first motor groove 118, and a second motor groove 120. The fluid inlet groove 116 is supplied with high pressure fluid from the pump 170 through the port 54 in the housing 10. The motor groove 118 is in fluid communication with one side of the motor 172 via the port 58 in the housing 10. The motor groove 120 is in fluid communication with the other side of the motor 172 via the port 62 in the housing 10. Located between the grooves 116, 118, and 120 are a series of annular seal grooves 122, each of which carries an annular seal 124 which bears against the bore 44 of the housing 10. The seals 124 block fluid leakage between the various grooves 116, 118, 120.

A passage 132 (see FIGS. 3 and 6) connects the annular fluid inlet groove 116 with the interior of the outer valve sleeve 48. A passage 134 connects the annular motor groove 118 with the interior of the outer valve sleeve 48. A passage 136 connects the annular motor groove 120 with the interior of the outer valve sleeve 48. A plurality of axially extending grooves 150, 152 (FIGS. 6 and 7) are formed on the inner surface of the outer valve sleeve 48. Located between these grooves are axially extending lands 142, 144. The grooves and lands formed on the inner surface of the outer valve sleeve 48, are in facing engagement with the grooves and lands on the outer surface of the inner valve sleeve 50.

A low pressure fluid return path 130 (shown schematically in FIG. 1) extends from the control valve to the fluid return line 66. The path 130 is provided for the return of any fluid which might leak between the inner valve sleeve 50 and the outer valve sleeve 48 adjacent the axial end surface 92 of the inner valve sleeve 50. The low pressure return path 130 enters the return line 66 downstream of the restrictor valve 68.

A constant volume of high pressure fluid from the pump 170 enters the control valve 46 (FIG. 6) through the inlet port 132 which is located in a land 142 in the outer valve sleeve 48. The high pressure fluid then enters into the opposed groove 104 in the inner valve sleeve 50. When the valve sleeves 48 and 50 are in a neutral position, the fluid then flows from the groove 104 and passes outwardly through the gaps 164 and 166 into the grooves 150 and 152 in the outer valve sleeve 48. The fluid in each of the grooves 150 and 152 can pass in one of two directions. The fluid in the groove 150 can either pass outwardly through the port 134 and line 56 to one side of the motor 172, or it can pass through the gap 162 into the groove 106A and thence out to the return chamber 101. Likewise, the fluid in the groove 152 can either pass out through the motor port 136 and line 60 to the other side of the motor 172, or it can pass through the gap 168 and flow out to the return chamber 101 through the groove 106B.

When the inner and outer valve sleeves 50 and 48 are angularly in a neutral position relative to each other as shown in FIG. 6, the gaps 164 and 166 are of equal size, allowing the high-pressure fluid entering the groove 104 through the inlet port 132 to flow equally outwards, one-half through the gap 164 and the other half through the gap 166. Also, the gaps 162 and 168, which are adjacent the return grooves 106A and 106B, are of a size equal to one another. Thus, the fluid flow paths within the control valve 46 are identical on either side of the inlet port 132, and incoming fluid will flow equally in both directions from the inlet port 132 out through the return grooves 106A and 106B. The pressures in the ports 134 and 136, which lead to the opposite sides of the fluid actuator 172, are thus equal, and no fluid force is applied to the motor 172.

When the steering input shaft 12 is rotated by driver input to the handwheel, the two valve members 48 and 50 will rotate relative to each other. Assume, for example, that the steering input shaft 12 is rotated in a counterclockwise direction as indicated by the arrow 174 in FIG. 6. The inner valve sleeve member 50, which is pinned to the input shaft 12, will rotate in the direction indicated by the arrow 174a relative to the outer valve Accordingly, the gaps 162 and 166 will be at least partially pinched or closed off, while the gaps 164 and 168 will be further opened, as compared to the neutral condition shown in FIG. 6. Since the gap 162 is partially closed, a greater percentage of the fluid in the groove 150 will be available to the port 134 leading to the motor 172. This will increase the hydraulic pressure on that side of the motor 172.

The incoming fluid which has passed through the gap 166 into the groove 152 can pass outwardly through the port 136 and line 60 to the other side of the motor 172, or through the gap 168 into the groove 106B which opens to return. Since the path to return is at a lower pressure than the path to the motor, the fluid in the groove 152 will tend to flow through the gap 168, rather than through the port 136 to the motor. The pressure in the line 60 to the motor 172 will thus drop. Increased pressure is therefore applied to one side of the motor 172 through the fluid line 56, causing the motor 172 to be moved in one direction. Such movement of the piston of the motor 172 causes the rack 32 (see FIG. 1) to move axially, turning the road wheels. As the rack 32 moves axially, it rotates the pinion 20 in a follow-up manner, causing the outer valve sleeve 48 to rotate also. When the power assist being provided has caused the rack 32 to move to the desired position, the pinion 20 will have rotated to the point where the attached outer valve sleeve 48 is again in a neutral position relative to the inner valve sleeve member 50. At this point, no further power assist will be provided.

The restrictor valve 68 (see FIG. 1), which is located in the fluid return line 66, is operative to vary the amount of power assist provided. In the preferred embodiment, the restrictor valve 68 is controlled as a function of vehicle speed. The restrictor valve 68 is preferably an electrically controlled valve, such as a solenoid actuated valve. It may be controlled by an electrical signal taken from a speed sensor, such as the speedometer of the vehicle. It is contemplated that various signals may be used to control the valve 68 other than or in combination with vehicle speed, for example vehicle lateral acceleration or angular turn of the steering wheel.

At low vehicle speeds, the restrictor valve 68 restricts fluid flow through the fluid return line 66, increasing the pressure in the fluid return chamber 101 (see FIG. 8), which pressure acts upon the axial end surface 98 of the inner valve sleeve 50. This pressure forces the inner valve sleeve member 50 axially (to the right as viewed in FIG. 8) against the bias of the spring 90. This causes the wide end portions 100 of the grooves 104, 106 to be progressively masked or covered by the opposed land portions 102 of the outer valve sleeve member 48, depending on how far the inner valve sleeve 50 moves axially.

As vehicle speed increases, the restrictor valve 68 opens more, allowing increased fluid flow outwardly through the return line 68. This decreases the pressure in the fluid return chamber 101 (see FIG. 9) and thus decreases the rightward (as seen in FIG. 9) axial force on the end surface 98 of the inner valve sleeve member 50. The biasing effect of the spring 90 causes the inner valve sleeve 50 to move axially leftwardly, progressively unmasking the wide end portions 100 of the grooves of the inner valve sleeve 50.

The effect of this axial movement of the inner valve sleeve 50 is shown by a comparison of FIGS. 6 and 7. FIG. 7 is a section through the control valve 46 in a high-speed position, with the wide end portions 100 of the grooves on the inner valve sleeve 50 completely unmasked. A comparison of FIG. 7 with FIG. 6 shows that in FIG. 7 each of the grooves 104 or 106 in the surface of the inner valve sleeve 50 is relatively wider than as seen in FIG. 6. For example, there may be a 4° gap between adjacent land corners in the position shown in FIG. 7, while there is only a 2° gap in FIG. 6.

With this larger gap, more relative rotation is necessary, between the valve sleeves 48 and 50, before power assist is generated. For example, in the high-speed position shown in FIG. 7, 4° of relative rotation between the two valve sleeves 48 and 50 is needed before the lands 144A and 140A overlap, closing the gap 162 and generating full assist; while in the low-speed position shown in FIG. 6, only 2° of relative rotation is needed before the lands 144A and 140A overlap, generating full assist. Thus, at higher speeds, it takes more relative rotation between the valve sleeves 48 and 50 to generate full assist.

Since the valve sleeves 48 and 50 are mechanically interconnected through the torsion bar 76, more twisting, or "wrap", of the torsion bar 76 is needed at higher speeds to generate full assist. Also, a greater force must be applied by the driver to the steering wheel to provide a given amount of power assist, than at lower speeds. Thus, the system is speed proportional, i.e., as speed increases, less power assist is provided for a given amount of steering wheel turning.

It can also be seen that when the wide end portions 100 are unmasked, the fluid flow paths into the grooves 106 which lead to return are enlarged, while the ports 134 and 136 leading to the motor 172 are unchanged in size. For a given amount of relative rotation of the valve elements 48 and 50, a greater percentage of the incoming fluid will pass to return, and a lower percentage will go to the motor 172. Thus, there will be lower fluid pressure to the motor, and there will be less assist (less psi at the motor) for a given amount of relative rotation, than at lower speeds.

One control valve 46 constructed in accordance with the present invention has a closed-end groove 104 with an overall length of about 21 mm, with its narrow portion being about 17 mm long and its wide end portion 100 being about 4 mm long. A cooperating groove 150 on the outer valve sleeve 48 is about 17 mm long. The relative widths of the groove 104 and the cooperating groove 150 are such that the gap 164 therebetween has (in the neutral position) an L-shape with the narrow portion about 0.33 mm wide and the wide portion about 0.65 mm wide. In the lowest speed position, the wide end portion 100 of the groove 104 is completely masked, leaving an effective flow area of about 5.6 mm$^2$, and needing only about 2° of relative rotation to generate full assist. In the highest speed position, a 4 mm long section of the narrow portion of the groove 104 is masked and the wide end portion 100 is unmasked, giving an effective orifice area of about 7.0 mm, an increase of about 25% and thus a corresponding decrease in assist pressure.

It is possible to tailor the rate at which assist drops off with increasing vehicle speed, by selecting or tailoring the relative widths of the various axial portions of the grooves 104 and 106 o the inner valve sleeve 50 when the sleeve 50 is manufactured. Thus, the overall system can be tailored to yield consistent driver feel and response at most vehicle speeds. Also, the wide end portions 100 may, if desired, be provided on the grooves of the outer valve sleeve 48 with appropriate design changes.

The present invention therefore provides for quick assist response at slow speeds, which is desirable for parking and low speed driving; and progressively slower, more gradual assist response as vehicle speed increases. The present invention also provides a speed responsive power assist system which does not result in valve bore wear. The outer valve sleeve 48 does not slide against the valve bore 44. The inner valve sleeve 50 slides axially along a smooth surface 75 on the input shaft 12.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, I claim:

1. A power assisted steering system for a vehicle, comprising:
    a housing;
    an input shaft projecting into said housing;
    an inner valve sleeve disposed in said housing coaxially about said input shaft, said inner valve sleeve being secured to said input shaft for rotation therewith, said inner valve sleeve being axially slidable along said input shaft;
    an outer valve sleeve disposed in said housing coaxially about said inner valve sleeve, said outer valve sleeve being axially fixed in said housing and rotatable relative to said inner valve sleeve;
    fluid flow control means on respective facing surfaces of said inner and outer valve sleeves for controlling fluid flow in response to relative rotation between said inner and outer valve sleeves, said fluid flow control means including a plurality of longitudinally extending grooves each including first and second axially opposite end portions, said first end portions being progressively masked and unmasked as said inner valve sleeve moves axially along said input shaft; and
    means for effecting axial movement of said inner valve sleeve in response to changes in vehicle speed.

2. A system as defined in claim 1 wherein said first end portions of said grooves are relatively wider than the remaining portions of said grooves.

3. A system as defined in claim 2 wherein said means for effecting axial movement comprises means defining a fluid return chamber in said housing, the pressure of fluid within said fluid return chamber bearing against a first axial end surface of said inner valve sleeve to urge said inner valve sleeve axially.

4. A system as defined in claim 3 further comprising biasing means acting upon a second axial end surface of said inner valve sleeve to position said inner valve sleeve axially against the pressure of fluid within said fluid return chamber.

5. A system as defined in claim 4 wherein said means for effecting axial movement further comprises restrictor valve means for controlling return fluid flow out of said fluid return chamber to vary the pressure of fluid within said fluid return chamber, said restrictor valve being progressively opened and closed as a function of vehicle speed.

6. A power assisted steering system for a vehicle, comprising:
    an input shaft;
    an outer valve sleeve disposed coaxially about said input shaft and having an inner surface defining a bore;
    an inner valve sleeve disposed coaxially between said input shaft and said outer valve sleeve and fitting closely within said bore of said outer valve sleeve and being rotatable relative to said outer valve sleeve;
    said inner valve sleeve being secured to said input shaft for rotational movement therewith and being axially slidably disposed on said input shaft;

said inner surface of said outer valve sleeve having a first set of axially extending grooves separated by lands;

said inner valve sleeve having an outer surface having thereon a second set of axially extending grooves separated by lands; and means for conducting hydraulic fluid under pressure into and out of said grooves, relative rotation between said inner and outer valve sleeves acting to vary the area of orifices defined by adjacent edges of opposing grooves and lands of said first and second sets to control the flow of hydraulic fluid in said system, axial movement of said inner valve sleeve relative to said outer valve sleeve varying the length and thus further varying the area of said orifices available for the flow of hydraulic fluid.

7. A system as defined in claim 6 wherein at least some of said grooves have relatively wide end portions which are masked and unmasked by axial movement of said inner valve sleeve.

8. A system as defined in claim 7 further comprising means for moving said inner valve sleeve axially in response to a variable related to operation of the vehicle.

9. A system as defined in claim 8 wherein said variable is vehicle speed.

10. A system as defined in claim 9 wherein said means for moving said inner valve sleeve axially includes restrictor valve means for controlling return fluid flow in response to vehicle speed.

11. A power assisted steering system for a vehicle, comprising:

a housing;

an input shaft projecting into said housing;

an output shaft;

an inner valve sleeve disposed in said housing coaxially about said input shaft;

said input shaft having a locator pin extending radially therefrom, said inner valve sleeve having an axially extending slot receiving said locator pin therein to secure said inner valve sleeve from rotation relative to said input shaft while providing for axial movement of said inner valve sleeve along said input shaft;

an outer valve sleeve axially fixed in said housing and disposed coaxially about said inner valve sleeve and being rotatable relative to said inner valve sleeve, said outer valve sleeve having an inner surface in facing engagement with an outer surface of said inner valve sleeve;

said inner surface of said outer valve sleeve having a first set of axially extending grooves separated by lands;

said outer surface of said inner valve sleeve having a second set of axially extending grooves and lands lying opposite to said first set of grooves and lands;

means for conducting hydraulic fluid under pressure into and out of said grooves, relative rotation between said inner and outer valve sleeves acting to vary the relative location of adjacent edges of opposing grooves and lands to control the flow of hydraulic fluid within said system;

portions of at least some of said grooves being progressively masked and unmasked by relative axial movement between said first and second sets of grooves and lands;

means defining a fluid return chamber the pressure in which is exposed to an axial end surface of said inner valve sleeve; and means for selectively varying the fluid pressure in said fluid return chamber to move said inner valve sleeve axially to mask and unmask said portions of at least some of said grooves.

12. A system as defined in claim 11 wherein said means for varying the fluid pressure in said fluid return chamber comprises means responsive to changes in vehicle speed.

13. A system as defined in claim 12 wherein at least some of said grooves on said outer surface of said inner valve sleeve include relatively wide groove end portions, and wherein axial movement of said inner valve sleeve progressively masks and unmasks said relatively wide end portions.

14. A system as defined in claim 12 wherein said means responsive to changes in vehicle speed includes restrictor valve means for controlling return fluid flow in response to vehicle speed.

* * * * *